United States Patent [19]

Yamada et al.

[11] Patent Number: 5,479,017
[45] Date of Patent: Dec. 26, 1995

[54] SCANNING MECHANISM FOR RADIATION TV SET

[75] Inventors: Tadashi Yamada, Kawasaki; Toshikatsu Sugaya, Mito; Yasushi Dounomae; Yoshio Kashimura, both of Ibaraki, all of Japan

[73] Assignee: Doryokuro Kakunenryo Kaihatsu Jigyodan, Tokyo, Japan

[21] Appl. No.: 225,811

[22] Filed: Apr. 11, 1994

[30]  Foreign Application Priority Data

Apr. 16, 1993 [JP] Japan .................................. 5-088988

[51] Int. Cl.$^6$ .................................................. G01T 1/29
[52] U.S. Cl. .................................. 250/336.1; 250/361 R; 378/98.2
[58] Field of Search .............................. 250/253, 336.1, 250/358.1, 360.1, 367, 370.11, 390.11, 347, 334, 361 R; 378/62, 98.2

[56]  References Cited

U.S. PATENT DOCUMENTS

| | | | |
|---|---|---|---|
| 2,688,095 | 8/1954 | Andrews | 250/361 X |
| 5,057,690 | 10/1991 | Morgan et al. | 250/336.1 |
| 5,204,533 | 4/1993 | Simonet | 250/361 |
| 5,286,973 | 2/1994 | Westrom et al. | 250/253 |

FOREIGN PATENT DOCUMENTS 60-227186  11/1985  Japan .

*Primary Examiner*—Carloyn E. Fields
*Assistant Examiner*—Edward J. Glick
*Attorney, Agent, or Firm*—Fish & Richardson

[57]  ABSTRACT

A radiation scanning mechanism is capable of increasing an observable range by eliminating a restriction on a scannable range of a conventional scanning mechanism for a radiation TV set for scanning an observation object by a directional radiation detector to display the distribution state of a radioactive material as an image. In the radiation scanning mechanism, an inner frame having a rotary shaft provided with a directional gamma-ray detector is attached to an outer frame having a rotary shaft so that the rotary shaft of the inner frame may perpendicularly and rotatably intersect the rotary shaft of the outer frame, and the rotary shaft of tile outer frame is rotatably supported by an outer frame support base.

10 Claims, 4 Drawing Sheets

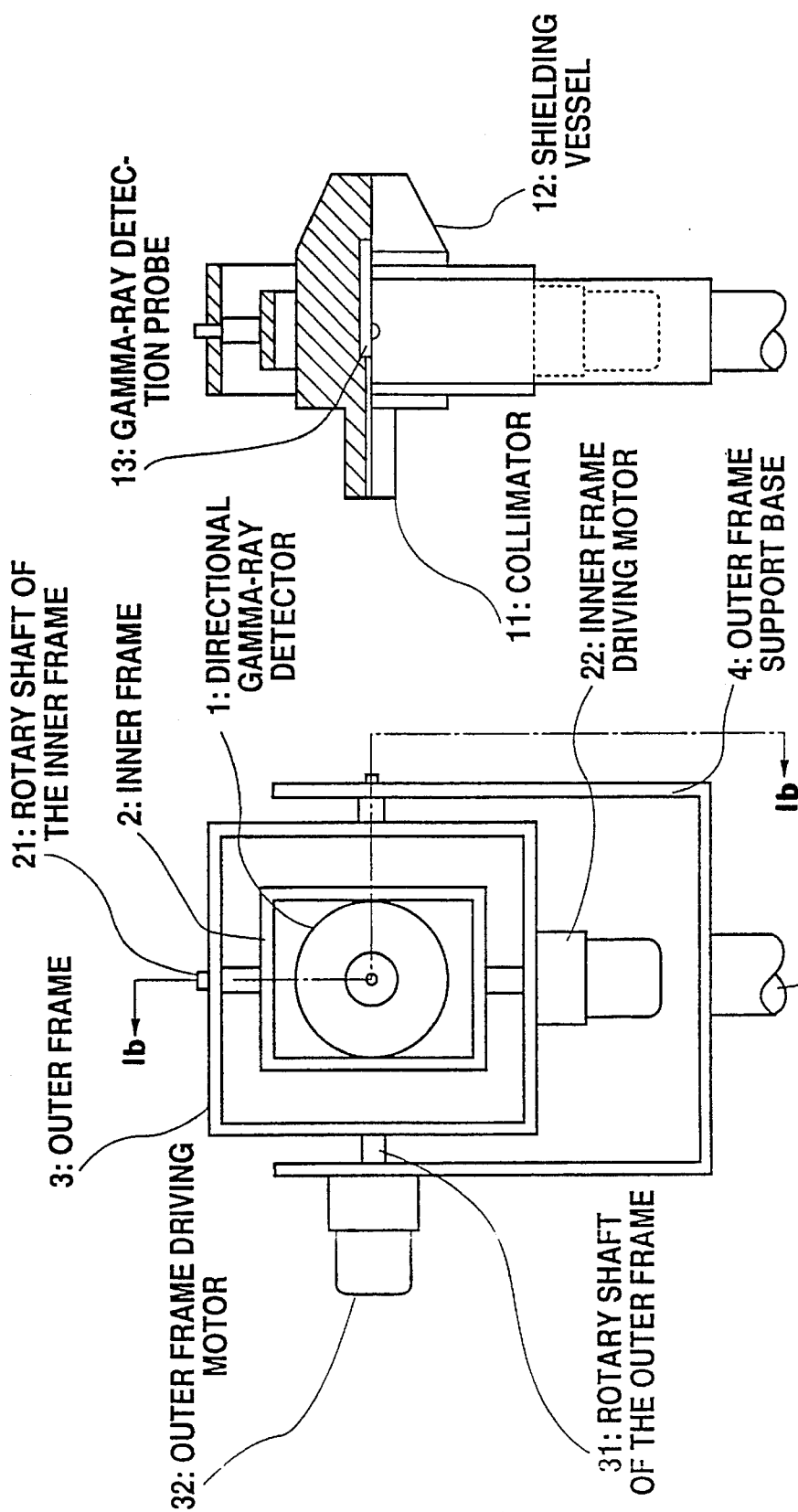

SCANNING MECHANISM FOR RADIATION TV SET

BACKGROUND OF THE INVENTION

1. Field of the Invention

The present invention relates to a scanning mechanism for a radiation monitoring TV set for remotely and automatically scanning and imaging the distribution state of a radioactive material with a directional radiation detector.

2. Description of the Related Art

In a nuclear power facility, a facility utilizing a radioisotope, or the like, it is necessary to carry out exposure control for workers by detecting a leakage direction, an intensity, a dose rate or the like of radiation (particularly, gamma rays) emitted from an equipment or a pipe and to prepare a radiation map or the like. The preparation of the radiation map for this control/administration can be made by a radiation TV set disclosed in, for example, the publication of Japanese Patent Application Laid-open No. 227186/1985. In this disclosed radiation TV set, the intensity and the distribution state of radioactivity from a radiation source are calculated by the use of a computer on the basis of information data regarding radiation obtained by scanning an observation object range with a directional gamma-ray detector and distance data obtained by observing an observation object with an optical range finder without manual intervention, and a color-divided radioactivity distribution image is formed in accordance to the intensity of the radioactivity. Then, this image is synthesized with an optical image of the observation object to display the synthesized image on a CRT.

In a conventional radiation TV set, it is assumed that observation is performed, putting the TV set in front of an observation object, and the range to be scanned by a directional gamma-ray detector is assumed to be a comparatively small range within the field of view caught by an optical-image camera tube in the front direction of the TV set. The conventional radiation TV set employs a scanning mechanism shown in FIGS. 2a and 2b in which vertical and horizontal pivots are not independent of each other, as a scanning mechanism for scanning an observation object range by vertically and horizontally rotating the orienting direction of the directional gamma-ray detector. Here, FIG. 2a shows the front of the scanning mechanism, and FIG. 2b shows a sectional view of the scanning mechanism in FIG. 2a along the line A–B in FIG. 2a.

In the scanning mechanism shown in these drawings, a gamma-ray detection probe 13 shown in FIG. 2b is received in a gamma-ray shielding vessel 12 made of a high-density metal such as lead, and this vessel 12 is equipped with a collimator 11 similarly made of a high-density metal such as lead and provided with a pore in an orienting direction, whereby a directional gamma-ray detector 1 shown in FIG. 2a is constituted. The directional gamma-ray detector 1 is attached to a vertically rotating frame 6 having a rotary shaft 61 on a line passing through the sensitivity center of the detector, and the rotary shaft 61 of the vertically rotating frame 6 is rotatably held by a horizontally rotating frame 7. The rotary shaft 61 can be driven by a vertically rotating frame driving motor 62 connected to the shaft 61.

A rotary shaft 71 is attached to the horizontally rotating frame 7 so as to cross at right ankles with the rotary shaft 61 of the vertically rotating frame 6. This rotary shaft 71 is rotatably held by a support rod 5, and torque is transmitted to the shaft 71 via a power transmission device 73 by a horizontally rotating frame driving motor 72 secured to the support rod 5.

The scanning operation of the scanning mechanism is performed by controlling the rotation of the vertically and horizontally rotating frame driving motors 62 and 72 in accordance with a command signal sent from a control section of the radiation TV set. However, a scanning range Φ, as shown in FIG. 3, depends upon an angle θ between the orienting direction of the directional gamma-ray detector 1 and the direction of the rotary shaft 71 of the horizontally rotating frame 7 and changes in accordance with the equation (1) to the same rotation angle ψ of the rotary shaft 71:

$$\Phi = \psi \sin \theta \qquad (1)$$

When the angle θ is about 90°, the value Φ becomes almost equal to ψ because of the nature of the sinusoidal function sin θ. However, when the angle θ deviates largely from 90°, scanning is carried out in a restricted range in view of the same rotation angle of the rotary shaft 71 of the horizontal scanning detector rotating frame 7. In an extreme case in which the direction of the detector coincides with the rotary shaft, i.e., θ=0, the scanning cannot be performed, depending upon the rotation.

In a conventional radiation TV set which is arranged in front of an observation object to scan radiation within the field of view caught by an optical-image camera tube, the scanning range is not so large and the central direction of the vertical scanning is 90° to the horizontal scanning rotary shaft. Therefore, the scanning range of a small angle around the direction of 90° is necessary and sufficient.

In a conventional radiation TV set in the above-mentioned background, there is employed a scanning system of a relatively simple structure in which the rotation of the vertical scanning follows the horizontal scanning rotary shaft.

SUMMARY OF THE INVENTION

It is an object of the present invention to provide a scanning mechanism for a radiation TV set which can inhibit the narrowness and the distortion of a scanning range by a directional gamma-ray detector even when the observation scanning range of a radiation TV set is largely set, can relieve the arrangement requirement of the TV set in front of an observation object, can orient a measuring section toward the observation object independently of the TV set arrangement direction, and can perform the distortion-free scanning in the set direction.

To achieve the above-mentioned object, the scanning mechanism of the present invention is provided with an inner frame designed so as to use a shaft passing through the detection center of a directional radiation detector as a rotary shaft, and a detector is attached to this frame.

Next, an outer frame is provided so as to use, as a rotary shaft, a shaft which passes through the detection center of the detector and which perpendicularly intersects the rotary shaft of the inner frame, and the rotary shaft of the inner frame is rotatably attached to the outer frame. Furthermore, an outer frame support base for rotatably holding the rotary shaft of the outer frame is provided.

A drive for rotatively driving the rotary shaft of the internally provided inner frame is mounted on the outer frame, and a driving mechanism for rotatively driving the rotary shaft of the held outer frame is mounted on the outer frame support base. Moreover, the same control section as in a known radiation TV set is used to control the operation of each driving mechanism.

The outer frame is rotated around the shaft held on the outer frame support base, the rotary shaft of the inner frame supported by the outer frame is simultaneously rotated by the same angle. The orienting direction of the directional gamma-ray detector is given by the rotation of the inner frame to which the detector is attached, but the orienting direction is always perpendicular to the rotary shaft of the inner frame serving as a rotary shaft for rotating the orienting direction, because the detector is secured to the inner frame. Therefore, the rotation angle of the orienting direction of the detector is kept constant to the rotational angle of the same inner frame regardless of the orienting direction.

BRIEF DESCRIPTION OF THE DRAWINGS

FIG. 1a is a mechanical/structural front view illustrating an embodiment of a scanning mechanism of the present invention;

FIG. 1b is a mechanical/structural sectional view illustrating an embodiment of a scanning mechanism of the present invention;

DESCRIPTION OF THE PREFERRED EMBODIMENT

Figures 2A, 2B:
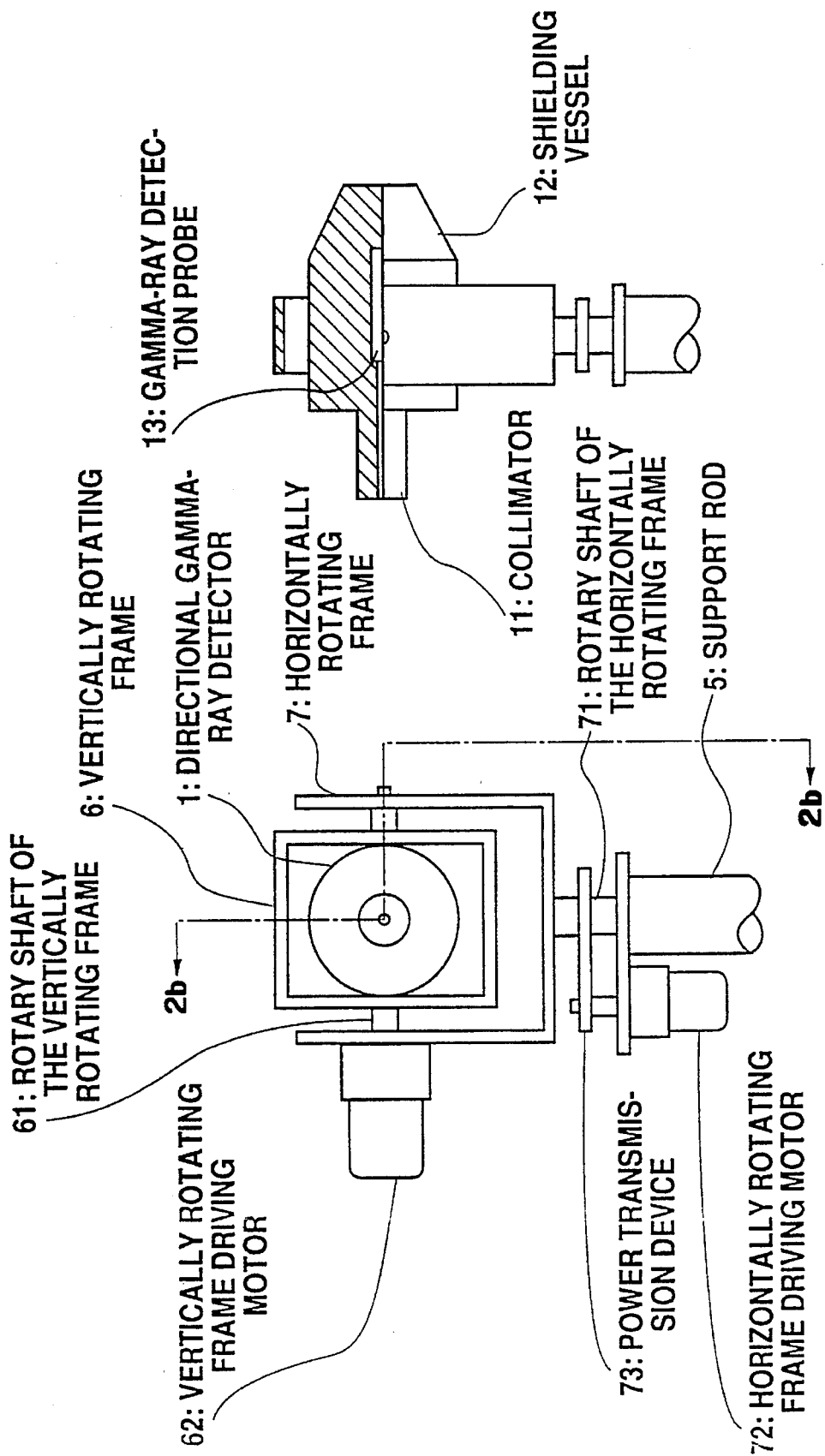
FIG. 2a is a structural front view illustrating a conventional scanning mechanism.
FIG. 2b is a structural sectional view illustrating a conventional scanning mechanism.
Figure 3:
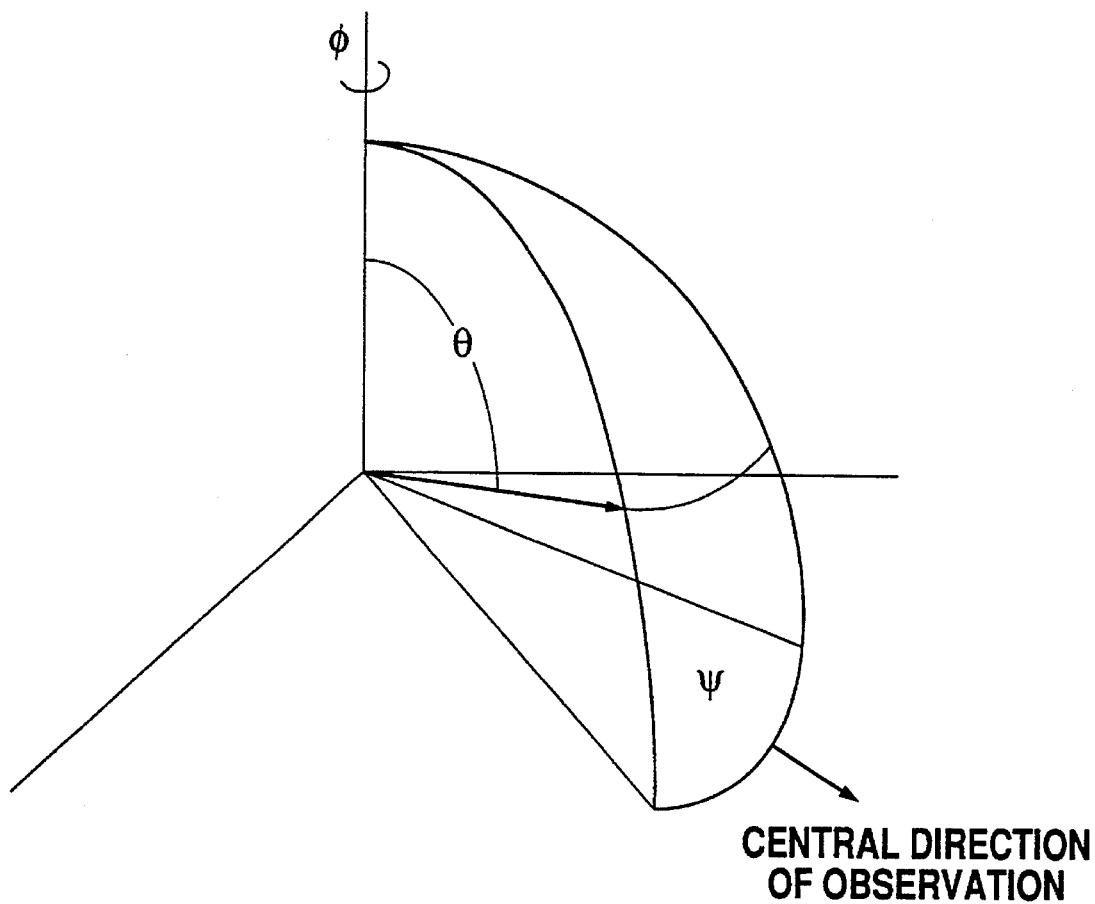
FIG. 3 is an illustrative view of a scanning range of the conventional scanning mechanism.

FIGS. 1a and 1b are illustrative views showing the fundamental structure of one embodiment of a scanning mechanism for a radiation TV set according to the present invention. FIG. 1a is a front view of the scanning mechanism, and FIG. 1b is a sectional view of the scanning mechanism in FIG. 1a cut along the line A–B in FIG. 1a.

In the scanning mechanism shown in FIGS. 1a and 1b, a gamma-ray detection probe 13 such as an NaI (sodium iodide) scintillation shown in FIG. 1b is received in a gamma-ray shielding vessel 12 made of a high-density metal such as lead, and this shielding vessel 12 is provided with a collimator 11 similarly made of a high-density metal such as lead and provided with a pore in an orienting direction, whereby a directional gamma-ray detector 1 shown in FIG. 1a is constituted.

This directional gamma-ray detector 1 is provided in an inner frame 2 having a rotary shaft 21 so that the detection center of the detector may be on the extension line of the rotary shaft 21.

The rotary shaft 21 of the inner frame 2 to which the detector is attached is rotatably mounted through an outer frame 3 having a rotary shaft 31. The rotary shaft 31 of this outer frame 3 is constituted so as to perpendicularly intersect the rotary shaft 21 of the inner frame 2 and to pass through the detection center of the directional gamma-ray detector 1, and the rotary shaft 31 of the outer frame 3 is rotatably held by an outer frame support base 4.

The rotary shafts 21 and 31 are connected with inner and outer frame driving motors 22 and 32, respectively, which are secured to the outer frame support base 4. These motors rotate the inner frame 2 and outer frame 3 in a predetermined sequence and range in accordance with a control signal sent from a control section constituting the radiation TV set so as to scan the orienting direction of the directional gamma-ray detector 1 in a predetermined range.

According to this mechanism, the rotary shaft 21 of the inner frame 2 rotates together with the outer frame 3 by the same angle, when the direction of the outer frame 3 is largely deviated from the axial direction of a support rod 5 by the rotation of the outer frame driving motor 32. Therefore, the perpendicularity with the horizontal scanning rotary shaft in the orienting direction of the detector 1 secured to the inner frame 2 can be kept, so that the scanning range is not narrowed due to the orienting direction.

Figure 4:
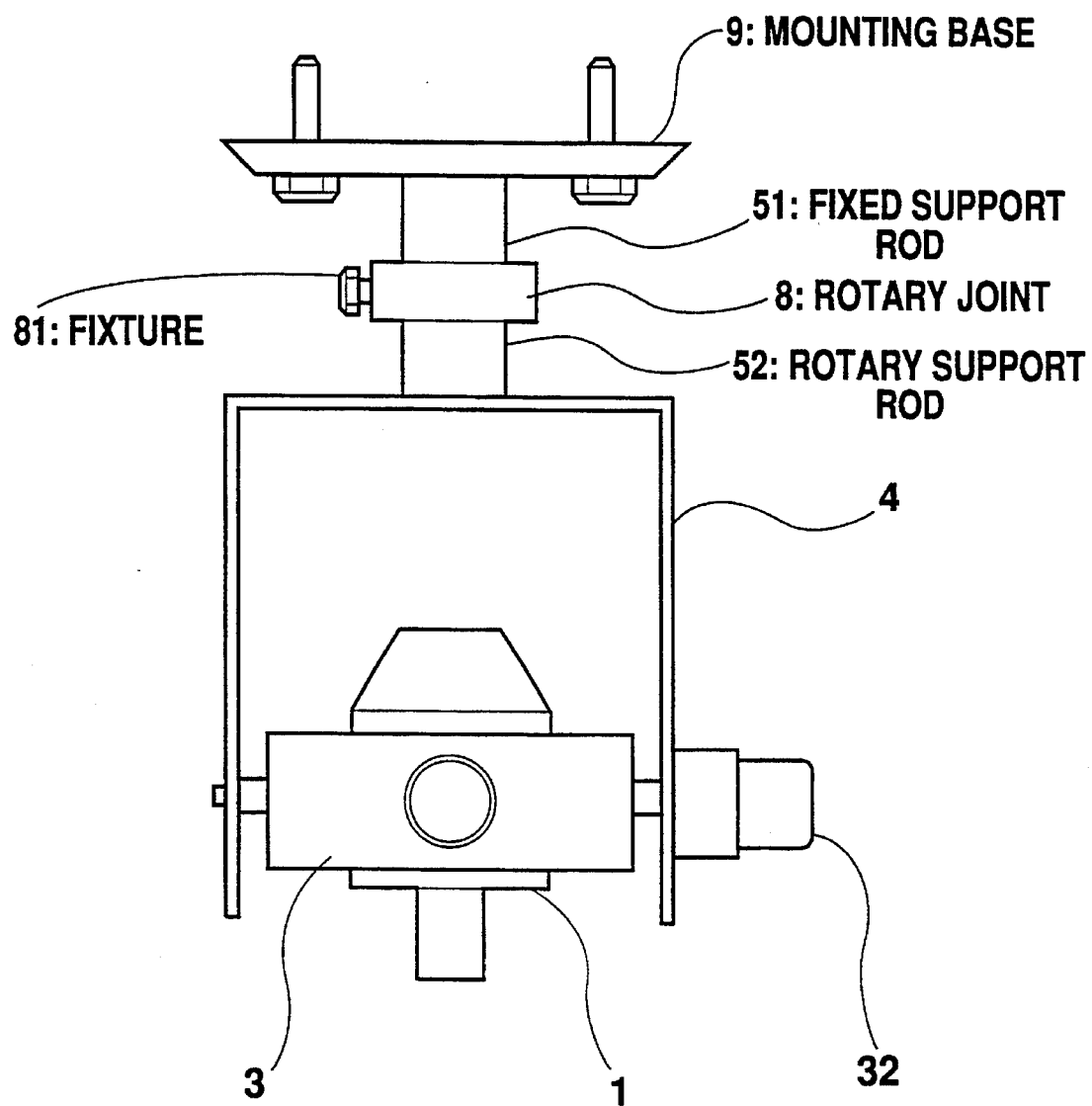
FIG. 4 is a structural view of a ceiling attachment type scanning mechanism of the present invention.

According to the scanning mechanism of this embodiment, scanning is possible over a larger range in the vertical and horizontal directions compared with the conventional scanning mechanism in FIGS. 2a and 2b, and the proper scanning operation is also possible even in the direction noticeably different from the front of the arranged TV set. For example, the same direction as the axis of the support rod 5 cannot be scanned by a conventional scanning mechanism, but according to the scanning mechanism of this embodiment, the initialized direction of the outer frame 3 can be oriented to a direction perpendicular to the surface direction of the outer frame support base 4, i.e., a direction perpendicular to the paper surface, whereby the above-mentioned direction can be scanned without any problem. That is, in the scanning mechanism of the present invention, if the direction of the surface of the outer frame support base 4 is only oriented to an observation object, a direction perpendicular to this direction is no longer restricted. FIG. 4 shows an embodiment of the scanning mechanism of the second aspect of the present invention which can be attached to a ceiling, a wall or a floor and which utilizes the above-mentioned characteristics.

In FIG. 4, a fixed support rod 51 which is integral with a mounting base 9 is secured by the mounting base 9 to the ceiling, the wall or the floor to which the scanning mechanism should be attached. A rotary support rod 52 for supporting an outer frame support base 4 which is the support rod of the scanning mechanism itself is supported rotatably to the fixed support rod 51 by a rotary joint 8, and the outer frame support base 4 is rotated in such a direction as to face an observation object direction and then fixed by a fixture 81.

In this embodiment, the gamma rays are used as radiation, but needless to say, the embodiment can be applied to the measurement of other types of radiation.

According to the first aspect of the present invention, there can be obtained the effect that even if a large scanning range is predetermined, the scanning range is not narrowed in its peripheral region, because the orienting direction of a directional radiation detector is always perpendicular to a rotary shaft for scanning. Furthermore, the second aspect of the present invention is provided with a mechanism for orienting, toward an observing direction, the facing direction of an outer frame support base for holding a mechanism itself which carries out scanning by a detector, and therefore any direction perpendicular to the mechanism can be scanned. Therefore, there is not a restriction that a TV set must be arranged in front of an observation object like a conventional scanning mechanism, and the uniform scanning is possible in all directions inclusive of the TV set arrangement point.

What is claimed is:

1. In a radiation monitoring system comprising a scanning mechanism for remote-scanning an observation object which is a radiation source by the use of a directional radiation detector, a scanning control section for controlling the operation of the scanning mechanism, and a radiation TV set for imaging scanning results, said radiation scanning mechanism comprising:

an inner frame which is provided with the directional radiation detector, and is rotatable around a rotary shaft perpendicularly intersecting a central axis of the detector and passing through a center of the detector;

an outer frame which rotatably supports the rotary shaft of the inner frame and is rotatable around a shaft perpendicular to the rotary shaft of the inner frame;

an outer frame support base for rotatably supporting a rotary shaft of the outer frame, said outer frame support base being secured to a support rod and the rotary shaft of the outer frame being perpendicular to the support rod;

an outer frame driving section which is secured to the outer frame support base, connected with the rotary shaft of the outer frame, and rotates the outer frame by a control output given from the scanning control section; and an inner frame driving section which is secured to the outer frame, connected with the rotary shaft of the inner frame, and rotates the inner frame by a control output given from the scanning control section.

2. The radiation scanning mechanism according to claim 1 wherein the directional radiation detector is used to detect gamma rays.

3. The radiation scanning mechanism according to claim 2 wherein the directional radiation detector comprises:

a collimator made of a high-density metal and provided with a pore in an orienting direction;

a detection probe for detecting gamma rays incoming through the collimator; and a shielding vessel made of a high-density metal which receives the detection probe therein.

4. The radiation scanning mechanism according to claim 3 wherein the detection probe is an NaI scintillator.

5. The radiation scanning mechanism according to claim 1 wherein the outer frame support base is rotatable around the support rod perpendicular to the rotary shaft of the outer frame.

6. The radiation scanning mechanism according to claim 5 wherein the directional radiation detector is used to detect gamma rays.

7. The radiation scanning mechanism according to claim 6 wherein said directional radiation detector comprises:

a collimator made of a high-density metal and provided with a pore in an orienting direction;

a detection probe for detecting gamma rays incoming through the collimator; and a shielding vessel made of a high-density metal which receives the detection probe therein.

8. The radiation scanning mechanism according to claim 7 wherein the detection probe is an NaI scintillator.

9. The radiation scanning mechanism according to claim 1, wherein the support rod further comprises:

a first support rod which is secured to the outer frame support base and which supports the outer frame support base;

a second support rod having a stationary section which can be attached to at least one of a ceiling, a wall and a floor and which is coaxial with the first support rod; and a rotary joint provided between the first and second support rods and capable of allowing rotation of the first support rod around the axis of the first support rod.

10. The radiation scanning mechanism according to claim 9 which is equipped with a fixture for fixing the rotational position of the first support rod and the outer frame support base in an optional direction by the rotary joint.

* * * * *